United States Patent
Jia et al.

(10) Patent No.: US 7,805,623 B2
(45) Date of Patent: Sep. 28, 2010

(54) POWER-SAVE CIRCUIT FOR COMPUTER

(75) Inventors: Qi-Zhong Jia, Shenzhen (CN); Ze-Shu Ren, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 672 days.

(21) Appl. No.: 11/765,452

(22) Filed: Jun. 20, 2007

(65) Prior Publication Data
US 2008/0168288 A1 Jul. 10, 2008

(30) Foreign Application Priority Data
Jan. 5, 2007 (CN) .................. 2007 2 0117916 U

(51) Int. Cl.
G06F 1/26 (2006.01)
G06F 1/32 (2006.01)
(52) U.S. Cl. .................. 713/300; 713/320; 713/324; 713/340; 714/15
(58) Field of Classification Search .......... 713/300, 713/320, 324, 340; 714/15
See application file for complete search history.

(56) References Cited

U.S. PATENT DOCUMENTS

| 5,315,161 | A | * | 5/1994 | Robinson et al. | ............... 307/66 |
| 6,775,784 | B1 | * | 8/2004 | Park | ........................... 713/320 |
| 6,895,515 | B1 | | 5/2005 | Yamazaki | |

* cited by examiner

*Primary Examiner*—Thomas Lee
*Assistant Examiner*—Michael J Brown
(74) *Attorney, Agent, or Firm*—Frank R. Niranjan

(57) ABSTRACT

A circuit adopted in a computer includes a power supply (20) with an output (PS_+5VSB) for providing a standby voltage, a motherboard (10) with a pin (MB_+5VSB) for receiving the standby voltage, a switch circuit (30) connected between the output of the power supply and the pin of the motherboard. The switch circuit has a control terminal fed with a S5# signal which is at high level to turn on the switch circuit, and at low level to turn off the switch circuit when the computer is in a S5 power state to cut off the standby voltage supply from the power supply to the motherboard for reducing power consumption of the motherboard; the control terminal of the switch circuit further being supplied with an inverted PWRBTN# signal for turning on the switch circuit when the PWRBTN# signal is at low level for switching on or off the computer.

15 Claims, 2 Drawing Sheets

POWER-SAVE CIRCUIT FOR COMPUTER

BACKGROUND

1. Technical Field

The present invention relates to power-save circuits, and more particularly to a power-save circuit capable of saving energy when a computer is it off state.

2. General Background

In a personal computer (PC) system, power management is adopted to conserve energy while the PC is in use and put the PC to sleep to save energy when the PC is not in use. System power states derive from the Advanced Configuration and Power Interface (ACPI) specification. They are defined as follows:

S0/Working—The CPU is fully up and running; devices are powering up and down as needed.
- S1—The CPU is stopped; RAM is refreshed; the system is running in a low power mode.

S2—The CPU has no power; RAM is refreshed; the system is in a lower power mode than S1.
- S3—The CPU has no power; RAM is in slow refresh; the power supply is generally in a reduced power mode (for example, it can't supply much power and is running in a lower power efficiency mode).
- S4—The hardware is completely off; system memory has been saved to disk.
- S5/Off—the hardware is completely off; the operating system has shut down; nothing has been saved.

When the computer is powered off and at S5/off state, there is still a +5V standby voltage (+5VSB) supply applied to a motherboard for driving a basic power source control circuit of the computer system during the off state. The control circuit provides advantages. For example, the system can be preset to be turned on automatically at night. Therefore, an international facsimile can be sent during a period of time that has a cheaper calling rate without the presence of an operator. Moreover, while no operator is available or present, the system can be turned on by an incoming event such as a signal received by a modem. The system can thus receive the incoming message or document automatically. However, this means the computer still consumes energy even in the off state.

What is needed, therefore, is power-save circuit capable of decreasing unnecessary power consumption when a computer is in an off state.

SUMMARY

A circuit adopted in a computer includes a power supply with an output for providing a standby voltage, a motherboard with a pin for receiving the standby voltage, and a switch circuit connected between the output of the power supply and the pin of the motherboard. The switch circuit has a control terminal fed with an S5# signal which is at high level to turn on the switch circuit, and at low level to turn off the switch circuit when the computer is at S5 power state to cut off the standby voltage supply from the power supply to the motherboard, thus reducing power consumption of the motherboard. The control terminal of the switch circuit is further supplied with an inverted PWRBTN# signal to turning on the switch circuit when the PWRBTN# signal is at low level for switching on or off the computer.

Other advantages and novel features will be drawn from the following detailed description of preferred embodiments with attached drawings, in which:

DETAILED DESCRIPTION OF PREFERRED EMBODIMENTS

Figure 1:
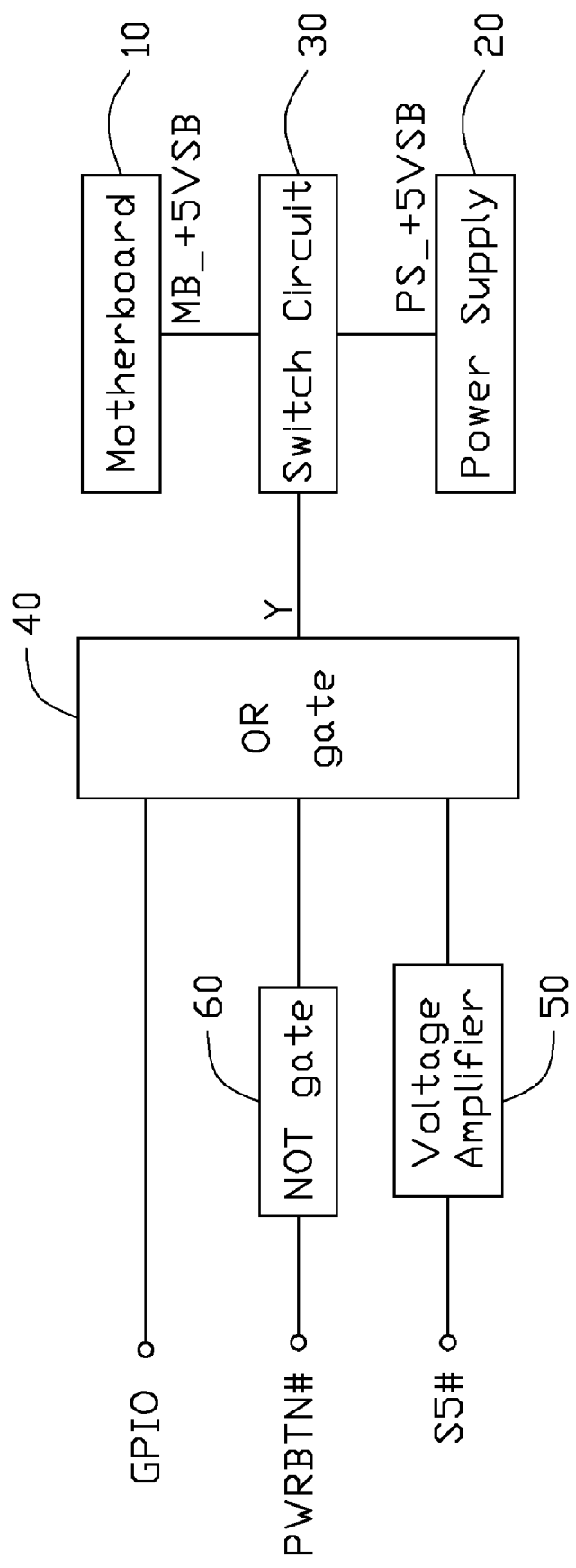
FIG. 1 is a schematic block diagram of a power-save circuit for a computer in accordance with a preferred embodiment of the present invention.

Referring to FIG. 1, a power-save circuit for a computer in accordance with a preferred embodiment includes a motherboard 10 with a MB_+5VSB pin, a power supply 20 with a PS_+5VSB pin for supplying +5VSB, and a switch circuit 30 connected between the MB_+5VSB pin of the motherboard 10 and the PS_+5VSB pin of the power supply 20 via its I/O (input/output) terminals respectively. The switch circuit 30 further has a control terminal connected with an output Y of an OR gate 40, the OR gate 40 has three input terminals fed with a GPIO signal, an inverted PWRBTN# signal, and an amplified S5# signal respectively. The PWRBTN# signal is supplied to the OR gate 40 via a NOT gate 60, and the S5# signal is supplied to the OR gate 40 via a voltage amplifier 50. The GPIO signal can be pulled high or low by BIOS of the computer. The PWRBTN# signal is a power on/off signal for the computer and is normally at high level when the computer is at a stable on or off state. When a south bridge chip of the motherboard 10 senses a high-low-high PWRBTN# signal, the power supply 20 is switched on or off consequently. The S5# signal is at low level after the power supply 20 is off and the computer is in an S5/off state, and at high level when the computer is at other power states. An input-output table illustrating relationships of the GPIO signal, the PWRBTN# signal, the S5# signal, and the output Y of the OR gate 40 is provided below:

| GPIO | PWRBTN# | S5# | Y |
|------|---------|-----|---|
| 1 | 0 | 1 | 1 |
| 1 | 0 | 0 | 1 |
| 1 | 1 | 1 | 1 |
| 1 | 1 | 0 | 1 |
| 0 | 0 | 1 | 1 |
| 0 | 0 | 0 | 1 |
| 0 | 1 | 1 | 1 |
| 0 | 1 | 0 | 0 |

(Where '0' represents a LOW voltage, and '1' represents a HIGH voltage)

As depicted in the table, when the GPIO signal is at high level, the outputs Y of the OR gate 40 is at high level whether the PWRBTN# signal and S5# signal are at high or low level, thereby turning on the switch circuit 30 and maintaining +5VSB to the motherboard 10 whatever power state the computer is at. When the PWRBTN# signal is at low level, the outputs Y of the OR gate 40 is at high level whether the GPIO signal and S5# signal are at high or low level, thereby turning on the switch circuit 30 and making sure that the motherboard 10 is active to sense the low level PWRBTN# signal and then powering on or off the power supply 20 consequently. When the GPIO signal is pulled low, and the PWRBTN# signal is at its stable high level, the output Y of the OR gate 40 is at high level to turn on the switch circuit 30 if the S5# signal is at high level, and at low level to turn off the switch circuit 30 if the S5# signal is at low level, thereby maintaining +5VSB to the motherboard 10 when needed and cutting off the supply of the +5VSB to the motherboard 10 in the S5/off state for saving energy.

Figure 2:
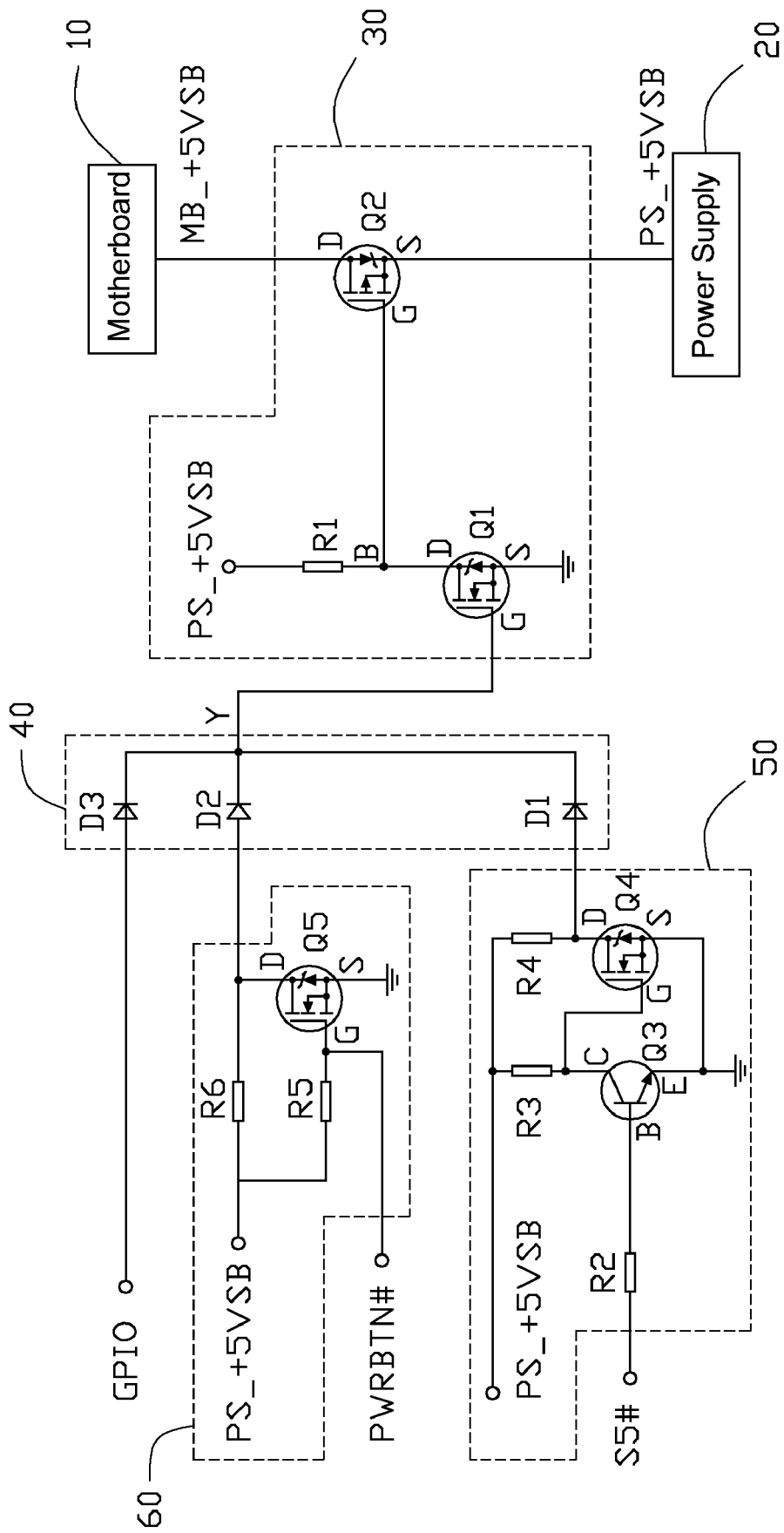
FIG. 2 is a detailed schematic diagram of the power-save circuit depicted in FIG. 1.

Referring to FIG. 2, the switch circuit 30 includes transistors Q1, Q2. A gate of the transistor Q1 is connected with the output Y of the OR gate 40, a drain of the transistor Q1 is connected with a gate of the transistor Q2 and supplied by the PS_+5VSB pin via a first resistor R1, and a source of the transistor Q1 is connected to ground. A drain of the transistor Q2 is connected with the $MB_{13}$ +5VSB pin of the motherboard 10, and a source of the transistor Q2 is connected with the PS_+5VSB pin of the power supply 20. The transistor Q1 is an N-channel-enhancement MOSFET, but the second transistor Q2 is a P-Channel-Enhancement MOSFET. When the output Y of the OR gate 40 is at high level, the transistor Q1 is turned on, thereby pulling the gate of the second transistor Q2 low to turn on the second transistor Q2 and maintain +5VSB to the motherboard 10. When the output Y of the OR gate 40 is at low level, the transistor Q1 is turned off, thereby pulling the gate of the second transistor Q2 high and turning off the second transistor Q2 to cut off supply of the +5VSB to the motherboard 10.

The OR gate 40 includes three diodes D1-D3 of which negative terminals all connect with the output Y of the OR gate 40. The S5# signal is coupled to a positive terminal of the first diode D1 via the voltage amplifier 50. The PWRBTN# signal is coupled to a positive terminal of the second diode D2 via the NOT gate 60. The GPIO signal is coupled to a positive terminal of the third diode D3.

The voltage amplifier 50 includes transistors Q3, Q4. The transistor Q3 has a base electrode fed the S5# signal via a second resistor R2, a collector electrode connected with a gate of the transistor Q4 and connected with the PS_+5VSB pin via a third resistor R3, and an emitter electrode connected to ground. A drain of the transistor Q4 is connected to the PS_+5VSB pin via a fourth resistor R4 and connected with the positive terminal of the first diode D1, and a source of the transistor Q4 is connected to ground. The transistor Q3 is a bipolar N-channel transistor. The transistor Q4 is an N-channel-enhancement MOSFET. When the S5# signal is at high level (about +3V) at S0, S1, S2, S3, or S4 power state, the transistor Q3 is turned on, and the transistor Q4 is turned off, thereby sending a high level output (about +5V) to the OR gate 40. A voltage of about +3V might not turn on the transistor Q1, thus the voltage amplifier 50 is adopted to turn on the first transistor Q1 reliably when the S5# signal is at high level.

The NOT gate 60 includes a transistor Q5 of which a gate is supplied with the PWRBTN# signal and further connected to the PS_+5VSB pin via a fifth resistor R5, a drain is connected to the PS_+5VSB pin via a sixth resistor R6 and further connected with the positive terminal of the second diode D2, and a source is connected to ground. When the PWRBTN# signal is at high level, the transistor Q5 is turned on, thereby sending a low level output to the OR gate 40. When the PWRBTN# signal is at low level, the transistor Q5 is turned off, thereby sending a high level output to the OR gate 40.

As described above, when the GPIO signal is set low level to enable the power-save function of the circuit, the switch circuit 30 is turned off to cut off the supply of the +5VSB to the motherboard 10 during the S5/off state, and turned on to maintain +5VSB to the motherboard 10 as needed when the S5# signal is at high level and/or the PWRBTN# signal is at low level. When the GPIO signal is set to be at high level to disable the power-save function of the circuit, the switch circuit 30 is turned on to maintain +5VSB to the motherboard to retain reboot or power monitor functions of the computer.

It is to be understood, however, that even though numerous characteristics and advantages have been set forth in the foregoing description of preferred embodiments, together with details of the structures and functions of the preferred embodiments, the disclosure is illustrative only, and changes may be made in detail, especially in matters of shape, size, and arrangement of parts within the principles of the invention to the full extent indicated by the broad general meaning of the terms in which the appended claims are expressed.

What is claimed is:

1. A circuit adopted in a computer, comprising:
   a power supply with an output for providing a standby voltage supply;
   a motherboard with a pin for receiving the standby voltage supply;
   a switch circuit connected between the power supply and the motherboard, the switch circuit having a control terminal fed with a S5# signal which is at high level to turn on the switch circuit when the computer is at S0, S1, S2, S3, or S4 power state such that the standby voltage supply is supplied to the motherboard via the switch circuit, and at low level to turn off the switch circuit when the computer is at S5 power state to cut off the standby voltage supply from the power supply to the motherboard for reducing power consumption of the motherboard; the control terminal of the switch circuit further being supplied with an inverted PWRBTN# signal for turning on the switch circuit when the PWRBTN# signal is at low level for switching on or off the computer; the control terminal of the switch circuit further being supplied with a GPIO signal; and
   an OR gate comprising three input terminals and one output terminal, the S5# signal, the PWRBTN# signal and the GPIO signal connected to the three input terminals, and the control terminal of the switch circuit connected to the output terminal to achieve the S5# signal, the PWRBTN# signal and the GPIO signal supplied to the control terminal of the switch circuit, any one of the S5# signal, the PWRBTN# signal and the GPIO signal respectively and singly controlling turning on the switch circuit.

2. The circuit as described in claim 1, wherein the switch circuit comprises a first transistor and a second transistor, a gate of the first transistor is coupled to the output terminal of the OR gate, a drain of the first transistor is supplied with the standby voltage, and a source of the first transistor is connected to ground, a gate of the second transistor is connected with the drain of the first transistor, a source and a drain of the second transistor are respectively connected with said output of the power supply and said pin of the motherboard.

3. The circuit as described in claim 2, wherein the first transistor is an N-channel-enhancement MOSFET, the second transistor is a P-channel-enhancement MOSFET.

4. The circuit as described in claim 1, wherein the GPIO signal is supplied to a first input terminal of the OR gate directly, the PWRBTN# signal is supplied to a second input terminal of the OR gate via a NOT gate, the S5# signal is supplied to a third input terminal of the OR gate via a voltage amplifier for reliably turning on the switch circuit when the S5# signal is at high level.

5. The circuit as described in claim 4, wherein the voltage amplifier comprises a third transistor and a fourth transistor, the third transistor has a base supplied with the S5# signal, a collector supplied with the standby voltage, and an emitter connected to ground, the fourth transistor has a gate connected with the collector of the third transistor, a drain connected to the standby voltage and further connected with said third input terminal of the OR gate, and a source connected to ground.

6. The circuit as described in claim 5, wherein the third transistor is an N-channel bipolar transistor, the fourth transistor is an N-channel-enhancement MOSFET.

7. The circuit as described in claim 4, wherein the GPIO signal is pulled high by a BIOS of the computer to turn on the switch circuit whether the PWRBTN# signal and S5# signal are at high or low level.

8. The circuit as described in claim 4, wherein the PWRBTN# signal is a power on/off signal for the computer, the PWRBTN# signal is at high level when the computer is at a stable on or off state, and is at low level when a power button of the computer is triggered to turn on the switch circuit whether the GPIO signal and S5# signal are at high or low level.

9. A circuit adopted in a computer, comprising:
a power supply with an output for providing a standby voltage supply;
a motherboard with a pin for receiving the standby voltage supply;
a switch circuit connected between the output of the power supply and the pin of the motherboard and having a control terminal;
a control circuit for controlling the switch circuit turning on or off, the control circuit comprising a plurality of input terminals and an output terminal coupled to the control terminal of the switch circuit, a first one of the input terminals being fed with a first signal which is at high level to turn on the switch circuit when the computer is not in an off state such that the standby voltage supply is supplied to the motherboard via the switch circuit, and at low level to turn off the switch circuit when the computer is at the off state to cut off the standby voltage supply from the power supply to the motherboard for reducing power consumption of the motherboard, a second one of the input terminals being supplied with an inverted PWRBTN# signal for turning on the switch circuit to allow the computer being capable of being switched on or off the computer when the computer is in the off state; wherein the control circuit functions as an OR gate, and any one of the first signal and the PWRBTN# signal respectively and singly controls turning on the switch circuit.

10. The circuit as described in claim 9, wherein a third one of the input terminals is supplied with a GPIO signal for singly selectively enabling or disabling the control circuit to control the switch circuit.

11. The circuit as described in claim 10, wherein the GPIO signal is supplied to the third one of the input terminals directly, the PWRBTN# signal is supplied to the another one of the input terminals via a NOT gate, and the first signal is supplied to the one of the input terminals via a voltage amplifier for turning on the switch circuit when the S5# signal is at high level.

12. The circuit as described in claim 11, wherein the voltage amplifier comprises a third transistor and a fourth transistor, the third transistor is an N-channel bipolar transistor, and the fourth transistor is an N-channel-enhancement MOSFET; the third transistor has a base supplied with the first signal, a collector supplied with the standby voltage, and an emitter connected to ground; the fourth transistor has a gate connected with the collector of the third transistor, a drain connected to the standby voltage and further connected to the first one of the input terminals of the switch circuit, and a source connected to ground.

13. The circuit as described in claim 11, wherein the PWRBTN# signal is a power on/off signal for the computer, the PWRBTN# signal is at high level when the computer is at a stable on or off state, and is at low level when a power button of the computer is triggered to turn on the switch circuit whether the GPIO signal and S5# signal are at high or low level.

14. The circuit as described in claim 13, wherein the NOT gate comprises a fifth transistor which is an N-channel-enhancement MOSFET, a gate of the fifth transistor is supplied with the standby voltage via a fifth resistor and further supplied with the PWRBTN# signal, a drain of the fifth transistor is supplied with the standby voltage via a sixth resistor and connected with the second one of the input terminals, and a source of the fifth transistor is connected to ground.

15. The circuit as described in claim 9, wherein the GPIO signal is pulled high by a BIOS of the computer to turn on the switch circuit whether the PWRBTN# signal and S5# signal are at high or low level.

* * * * *